United States Patent [19]

Nelson

[11] 4,004,850
[45] Jan. 25, 1977

[54] MIRROR APPARATUS

[76] Inventor: Arlan L. Nelson, N79 W16188 Community Drive, Menomonee Falls, Wis. 53051

[22] Filed: Sept. 22, 1975

[21] Appl. No.: 615,381

[52] U.S. Cl. .............................. 350/299; 248/472; 248/474; 248/481; 248/166
[51] Int. Cl.² ...................... G02B 5/08; A47F 7/14
[58] Field of Search .......... 248/164, 431, 432, 165, 248/466, 469, 472, 474, 475 R, 476, 479–482, 484–487; 350/299, 304, 305, 303

[56] References Cited

UNITED STATES PATENTS

| | | | |
|---|---|---|---|
| 76,253 | 3/1868 | Scottron | 350/305 |
| 116,589 | 7/1871 | Hartmann | 350/299 |
| 384,784 | 6/1888 | Pihl | 350/304 |
| 404,110 | 5/1889 | Pincus | 248/474 X |
| 647,171 | 4/1900 | Wiles | 248/164 X |
| 898,263 | 9/1908 | Rice | 248/474 |
| 1,144,726 | 6/1915 | Robinson et al. | 248/165 X |
| 1,263,955 | 4/1918 | Stansbury | 248/474 X |
| 1,992,233 | 2/1935 | Norwood | 350/299 X |
| 2,368,740 | 2/1945 | Blomgren | 248/164 X |
| 2,749,147 | 6/1956 | Herrschaft | 248/431 |
| 3,167,292 | 1/1965 | Meyerowitz | 248/124 X |
| 3,309,055 | 3/1967 | Sefcik | 248/431 |
| 3,567,313 | 3/1971 | Craig | 350/299 |
| 3,709,585 | 1/1973 | Tsai | 350/305 |

FOREIGN PATENTS OR APPLICATIONS

| | | | |
|---|---|---|---|
| 424,928 | 1/1911 | France | 350/305 |
| 62,366 | 6/1955 | France | 350/304 |
| 1,224,603 | 6/1960 | France | 350/305 |
| 1,240,031 | 7/1960 | France | 248/481 |
| 85,829 | 9/1965 | France | 248/481 |
| 617,959 | 6/1927 | France | 350/305 |
| 502,001 | 11/1954 | Italy | 248/482 |

*Primary Examiner*—Lawrence J. Staab
*Attorney, Agent, or Firm*—James L. Kirschnik

[57] ABSTRACT

A portable mirror for use in hunting includes a tripod base having individually adjustable legs for adapting to various terrain configurations. A central vertical post is mounted on the tripod and supports a pair of articulating mirrors. The mirrors are individually rotatably adjustable about their own longitudinal axes as well as pivotally adjustable about the longitudinal axis of the post. The mirrors are vertically slidable along the post relative to the ground.

4 Claims, 6 Drawing Figures

U.S. Patent  Jan. 25, 1977  4,004,850
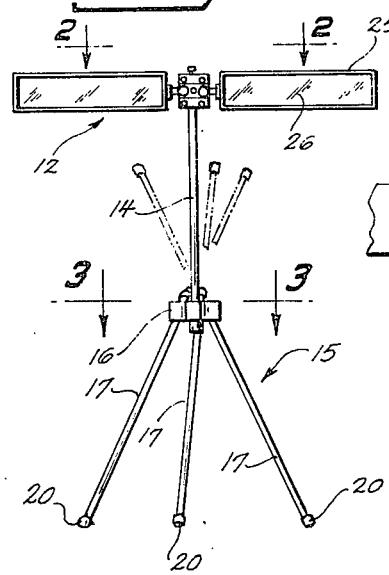
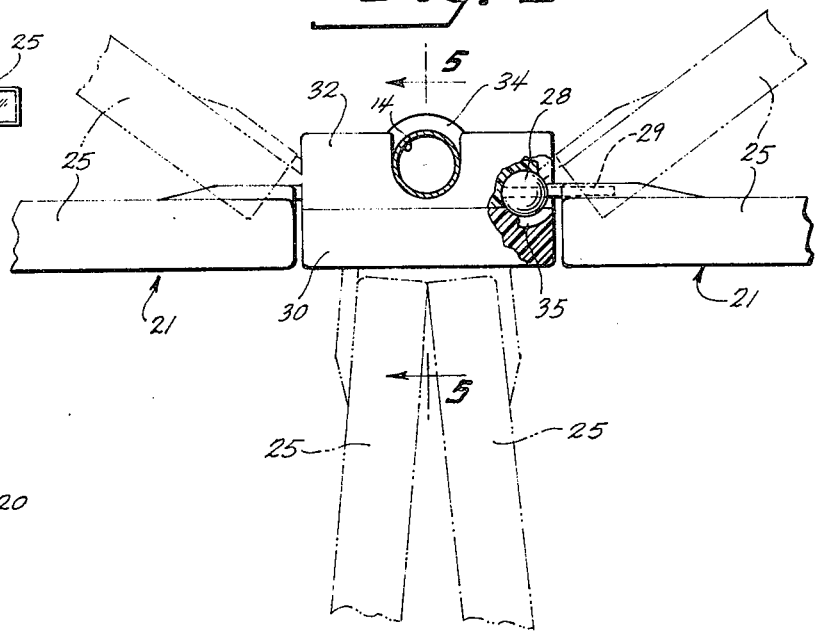
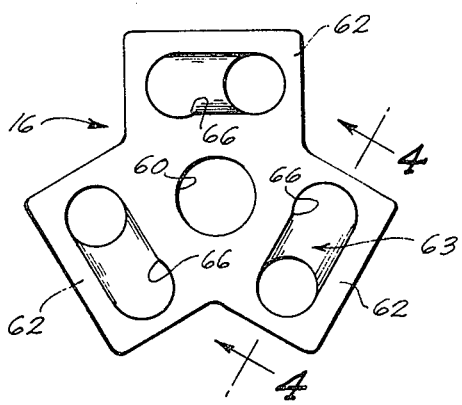
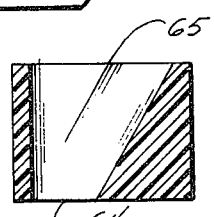
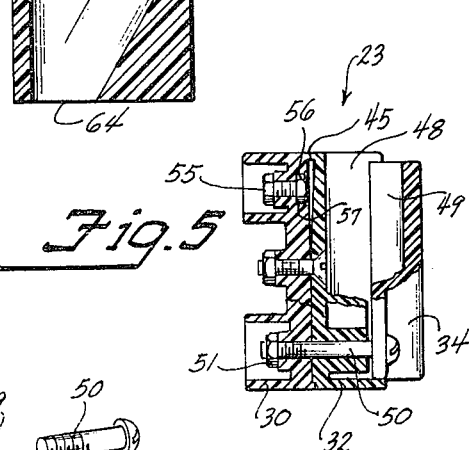
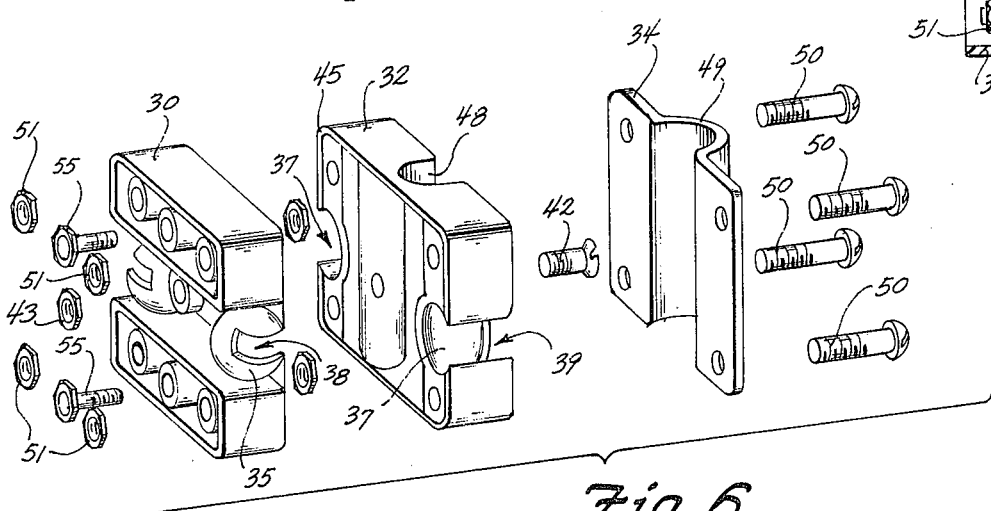

MIRROR APPARATUS

BACKGROUND OF THE INVENTION

In the hunting of game animals such as deer, a hunter will often take a stand in the woods and wait quietly for the passage of his quarry. Many animals, especially deer, are highly sensitive to movement. Accordingly, the hunter must remain as motionless as possible often for long periods of time if he hopes to be successful. Naturally the requirement that the hunter remain motionless makes it unadvisable for him to move his head to view the surrounding area. Furthermore, it is also often desirable to stand or sit with one's back to a tree for comfort and concealment, however, a major disadvantage of such a position is the inability to view the area behind without looking around the tree.

SUMMARY OF THE INVENTION

The present invention provides a portable mirror apparatus which may be easily transported and is adaptable to be supported on terrain of varying contour. An adjustable tripod is provided for supporting articulating mirros which are also vertically adjustable. The entire apparatus is collapsible into a compact unit for carrying and is constructed of lightweight, weather-resistant materials.

DESCRIPTION OF THE DRAWING

FIG. 1 is a perspective view of a mirror apparatus according to the invention;
FIG. 2 is a view taken along line 2—2 of FIG. 1;
FIG. 3 is a view taken along line 3—3 of FIG. 1;
FIG. 4 is a view taken along line 4—4 of FIG. 3;
FIG. 5 is a view taken along line 5—5 of FIG. 2; and
FIG. 6 is an exploded perspective view of the mounting bracket for the mirrors.

DESCRIPTION OF THE PREFERRED EMBODIMENT

As shown in FIG. 1, a mirror apparatus 10 according to the invention includes a mirror assembly 12 slidably mounted on a vertical support rod 14. A tripod assembly 15 having a mounting block 16 is mounted on the lower end of the rod 14 and includes three supporting legs 17. Rod 14 and legs 17 may be made of a tubular, weather-resistant, metal, such as anodized aluminum and end caps 20 may be provided on the ends of the rod 14 and legs 17 for protection.

With reference to FIGS. 1, 2, 5 and 6, the mirror assembly 12 is seen to comprise a pair of mirrors 21 supported in a mounting bracket assembly 23 which slidably engages rod 14. Each mirror 21 may include an outer case 25 which receives a reflective glass or metal mirror 26 and has a spherical appendage or ball 28 affixed to one end. A pin 29 may be provided within ball 28 for strengthening its connection with mirror case 25. Each ball 28 is articulatingly secured in opposite sides of the block assembly 23 so that the mirrors 21 may be completely rotated about their longitudinal axes as well as angularly positioned about the rod 14. As indicated in phantom in FIG. 2, the mirrors 21 are angularly positionable between a face-to-face 0° engagement and a rearward extreme position greater than 180° limited by a groove in bracket assembly 23 as will be described hereinafter. In addition, if bracket assembly is reversed on rod 14, the mirrors may be folded all the way to a back-to-back configuration.

Referring to FIGS. 2, 5 and 6, the bracket assembly 23 comprises a front section 30, rear section 32 and a retainer plate 34. Front section 30 includes a pair of hemispherical sockets 35 which align with mating hemispherical sockets 37 formed in the adjoining face of the rear section 32. When the front and rear sections 30 and 32 are placed together it will thus be seen that sockets 35 and 37 may secure the balls 28 of mirrors 21 within the block assembly 23. Each socket, 35 and 37, has a generally horizontal groove, 38 and 39 respectively, formed therein for permitting the junction between balls 28 and the mirror cases 25 to move therein for angularly positioning mirrors 21. Obviously the total angular travel of the mirrors 21 will be limited to the extent of grooves 38 and 39. A central screw 42 and nut 43 may be provided for securing the front and back sections 30 and 32 together. As seen in FIGS. 5 and 6, the front and rear sections 30 and 32 have a slight peripheral border 45 at their interface resulting in their mating surfaces having a slight space or relief between them. This is provided so upon increasing the tension on the screw 42, joining the two sections 30 and 32, the sections will deflect to increase the frictional engagement between balls 28 and sockets 35 and 37. The mirrors 21 will tend to maintain a preselected angular and rotary position due to this friction. The back surface of rear section 32 has a semicylindrical vertical channel 48 formed therein for engagement with rod 14. The retainer plate 34 has a corresponding semicylindrical channel 49. Screws 50 and nuts 51 may be provided for securing the front and rear sections 30 and 32 and retainer plate 34 together. The semicylindrical channels 48 and 49 are dimensioned so they frictionally engage rod 14 and maintain the position of the mirror assembly 12 but permit manual movement vertical movement along rod 14 under a suitable force. To permit adjustment of the amount of friction between block assembly 23 and rod 14, adjustment screws 55 may be provided in front section 30. The screws 55 engage nuts 56 trapped in suitable recesses 57 formed in the face of front section 30 abutting rear section 32 and in alignment with the outside of channel 48. Upon tightening of the screws 55, the trapped nuts 56 will draw the ends of the screws 55 into engagement with channel 48. Depending on the degree of screw travel, the channel 48 may be slightly distorted into an out of round condition which will increase the friction force between block assembly 23 and rod 14.

The tripod block 16 is shown in FIGS. 1, 3 and 4. Block 16 has a central aperture 60 for frictionally engaging rod 14. Three equiangularly spaced radial protrusions 62 extend from the block 16 for receiving the legs 17. Each protrusion 62 has an angularly extending aperture 63 which begins as a circular hole 64 at the bottom surface of the block 16 and expands upwardly into a generally elliptical shape 65 at the top of the block 16. Along the inner surface of each aperture 63 a raised ridge 66 is provided which extends generally parallel to the axis of each leg 17 in its normal position. The ridge 66 acts as a locking device for each leg 17 and is dimensioned such that as a leg 17 is pivoted to a generally vertical position, it will freely slide up and down within the circular hole 64. Upon adjusting the leg 17 to its desired longitudinal position in block 16, the leg 17 may be pivoted toward the angular side of aperture 63 past ridge 65 which frictionally maintains the leg in the selected position. Each leg 17 is individually adjustable between the extremes shown in FIG. 1 in solid and in phantom.

Since the mirror apparatus is designed primarily for hunters and will be exposed to the elements, bracket assembly 23, tripod block 16, and the mirror cases 25 are preferably made of a weather-resistant, durable material such as nylon. The legs 17 and rod 14 may be metal such as anodized aluminum. This construction results in a device which is adjustable in relative silence. The individual parts are preferably colored with a non-glare, dull coating. Since the legs 17 are slidable relative to block 16 and assembly 23, the entire device may be easily disassembled or collapsed for ease in carrying. The mirrors 21 may be pivoted to face each other thus protecting the mirror surfaces. Additionally, if desired, the mirror assembly may be removed from the tripod and separately secured to a suitable base such as a tree. In the field, each mirror 21 is individually adjustable to provide the hunter with a view of the desired portions of the terrain behind him.

While one embodiment of the invention has thus been described, those skilled in the art will appreciate that variations in materials and design may be possible without departing from the inventive concept. For example, a suitable glare shield could be provided on each mirror case 25 to reduce reflections. Any simple pivotable panel mounted above each mirror case 25 would suffice. Accordingly the scope of the invention is to be taken solely from an interpretation of the claims which follows.

I claim:

1. Apparatus comprising:
   a support rod;
   bracket means slidably mounted on said support rod;
   at least two mirrors articulatingly supported in said bracket means and pivotally movable about an axis parallel to said support rod;
   means comprising a plurality of legs for supporting said apparatus, said legs being coupled to said support rod and being individually adjustable to permit said support rod to remain relatively vertical on uneven terrain;
   said bracket means including at least one pair of opposed spherical chambers, each chamber having an elongated slot formed therein;
   said mirrors each having a generally spherical protuberance received by one of said chambers for being articulatingly supported in said bracket means;
   said bracket means having a generally vertical aperture for receiving said support rod;
   means for deforming said bracket aperture to increase the friction between said aperture and said support rod;
   said means for supporting said apparatus comprising block means having a plurality of apertures and a generally tubular leg slidably received in each aperture, each leg frictionally contacting said aperture;
   said block means having a central aperture for receiving said support rod; and
   each of said plurality of apertures extending at an acute angle relative to a horizontal plane and having a generally circular opening on one side of said block tapering to a generally elliptical opening on the opposite side of said block, said legs being pivotable within said aperture between a first position and a second position, said legs being freely slidable relative to said block in said first position, and frictionally fixed in said block in said second position.

2. Apparatus comprising:
   a support rod;
   bracket means slidably mounted on said support rod;
   at least two mirrors articulatingly supported in said bracket means and pivotally movable about an axis parallel to said support rod;
   means for supporting said apparatus comprising block means having a plurality of apertures and a generally tubular leg slidably received in each aperture, each leg frictionally contacting each aperture;
   said block means having a central aperture for receiving said support rod; and
   each of said plurality of apertures extending at an acute angle relative to a horizontal plane and having a generally circular opening on one side of said block tapering to a generally elliptical opening on the opposite side of said block, said legs being pivotable within said aperture between a first position and a second position, said legs being freely slidable relative to said block in said first position, and frictionally fixed in said block in said second position.

3. Apparatus as set forth in claim 2, wherein:
   said bracket means includes at least one pair of opposed spherical chambers, each chamber having an elongated slot formed therein; and
   said mirrors each having a generally spherical protuberance received by one of said chambers for being articulatingly supported in said bracket means.

4. Apparatus as defined in claim 3, including:
   means for deforming said bracket central aperture to increase the friction between said aperture and said support rod.

* * * * *